(12) United States Patent
Ma et al.

(10) Patent No.: US 8,694,231 B2
(45) Date of Patent: Apr. 8, 2014

(54) VEHICLE ROLLBACK CONTROL SYSTEMS AND METHODS

(75) Inventors: Qi Ma, Farmington Hills, MI (US); Robert Douglas Shafto, New Hudson, MI (US)

(73) Assignee: GM Global Technology Operations LLC

( * ) Notice: Subject to any disclaimer, the term of this patent is extended or adjusted under 35 U.S.C. 154(b) by 883 days.

(21) Appl. No.: 12/835,856

(22) Filed: Jul. 14, 2010

(65) Prior Publication Data

US 2011/0290216 A1 Dec. 1, 2011

Related U.S. Application Data

(60) Provisional application No. 61/350,178, filed on Jun. 1, 2010.

(51) Int. Cl.
  *F02N 11/00* (2006.01)

(52) U.S. Cl.
  USPC ..... 701/113; 701/54; 180/65.265; 180/65.28; 123/179.4; 123/339.11

(58) Field of Classification Search
  USPC .......... 180/65.265, 65.28; 123/179.4, 339.11, 123/339.15, 339.16; 701/54, 113
  See application file for complete search history.

(56) References Cited

U.S. PATENT DOCUMENTS

| | | |
|---|---|---|
| 4,492,195 A | 1/1985 | Takahashi et al. |
| 4,958,516 A | 9/1990 | Stiles et al. |
| 5,690,073 A | 11/1997 | Fuwa |
| 5,803,040 A | 9/1998 | Biesinger et al. |
| 6,202,776 B1 * | 3/2001 | Masberg et al. ........... 180/65.22 |
| 6,257,207 B1 | 7/2001 | Inui et al. |
| 6,275,759 B1 | 8/2001 | Nakajima et al. |
| 6,513,489 B2 * | 2/2003 | Osanai ..................... 123/339.11 |
| 6,675,088 B2 * | 1/2004 | Miki .............................. 701/112 |
| 6,675,768 B2 | 1/2004 | Kanai |
| 6,758,190 B2 | 7/2004 | Denz et al. |
| 6,857,987 B2 * | 2/2005 | Aldrich et al. ................ 477/110 |
| 7,079,935 B2 | 7/2006 | Lewis et al. |
| 7,079,941 B2 | 7/2006 | Tetsuno et al. |
| 7,082,930 B2 | 8/2006 | Liller et al. |
| 7,130,731 B2 | 10/2006 | Itoh et al. |
| 7,146,960 B2 | 12/2006 | Phlips et al. |

(Continued)

FOREIGN PATENT DOCUMENTS

| CN | 1407221 A | 4/2003 |
|---|---|---|
| CN | 1912370 A | 2/2007 |

(Continued)

OTHER PUBLICATIONS

U.S. Appl. No. 12/835,830, filed Jul. 14, 2010, Qi Ma et al.

(Continued)

*Primary Examiner* — Erick Solis

(57) ABSTRACT

A control system for an auto-stop/start vehicle includes a transmission load module, a target engine speed module, and an actuator control module. The transmission load module determines a load imposed on an engine through a transmission. The target engine speed module selectively determines a target engine speed during an engine startup event based on the load. The actuator control module controls at least one engine actuator based on the target engine speed during the engine startup event.

26 Claims, 6 Drawing Sheets

(56) References Cited

U.S. PATENT DOCUMENTS

| | | |
|---|---|---|
| 7,177,755 B2 | 2/2007 | Nishikawa et al. |
| 7,204,226 B2 | 4/2007 | Zillmer et al. |
| 7,559,304 B2 | 7/2009 | Kataoka et al. |
| 7,587,270 B2 | 9/2009 | Tabata et al. |
| 7,931,002 B1 | 4/2011 | Gibson et al. |
| 8,099,203 B2 | 1/2012 | Miller et al. |
| 8,140,247 B2 | 3/2012 | Gibson et al. |
| 8,141,533 B2 | 3/2012 | Demura |
| 8,157,035 B2 | 4/2012 | Whitney et al. |
| 8,408,176 B2 | 4/2013 | Pursifull et al. |
| 8,442,747 B2 | 5/2013 | Ma et al. |
| 2004/0084002 A1* | 5/2004 | Mitsutani et al. ......... 123/179.4 |
| 2004/0153236 A1* | 8/2004 | Itoh et al. ..................... 701/113 |
| 2006/0048734 A1 | 3/2006 | Kataoka et al. |
| 2006/0218923 A1* | 10/2006 | Sopko et al. ..................... 60/607 |
| 2007/0163531 A1 | 7/2007 | Lewis et al. |
| 2007/0261668 A1 | 11/2007 | Kataoka et al. |
| 2008/0275624 A1 | 11/2008 | Snyder |
| 2009/0066337 A1 | 3/2009 | Gibson et al. |
| 2009/0299586 A1 | 12/2009 | Miller et al. |
| 2010/0038158 A1 | 2/2010 | Whitney et al. |
| 2010/0114462 A1 | 5/2010 | Gibson et al. |
| 2010/0174473 A1* | 7/2010 | Pursifull et al. ............. 701/112 |
| 2010/0211299 A1 | 8/2010 | Lewis et al. |
| 2012/0245831 A1 | 9/2012 | Patterson et al. |
| 2013/0066540 A1 | 3/2013 | Lewis et al. |

FOREIGN PATENT DOCUMENTS

| | | | |
|---|---|---|---|
| CN | 101598214 A | 12/2009 | |
| CN | 101680414 | 3/2010 | |
| JP | 02081939 A * | 3/1990 | ............. F06D 41/16 |

OTHER PUBLICATIONS

U.S. Appl. No. 12/835,835, filed Jul. 14, 2010, Qi Ma et al.
U.S. Appl. No. 12/835,842, filed Jul. 14, 2010, Qi Ma et al.
U.S. Appl. No. 12/835,848, filed Jul. 14, 2010, Qi Ma et al.
U.S. Appl. No. 12/835,942, filed Jul. 14, 2010, Qi Ma et al.
U.S. Appl. No. 12/835,951, filed Jul. 14, 2010, Qi Ma et al.
Rajamani, "Vehicle Dynamics and Control", 2006, pp. 111-117.
Ohata et al., "Benchmark Problem for Automotive Engine Control", SICE Annual Conference, Sep. 2007, pp. 1723-1726.
Rokusho et al., "Combined Feedforward and Feedback Control for Start-Up Engine Control", 27th Chinese Control Conference, Jul. 2008, pp. 562-565.
Zhang et al., "Model-Based Cold-Start Speed Control Design for SI Engines", Proceedings of the 17th World Congress of the International Federation of Automatic Control, Jul. 2008, pp. 1042-1047.
Saerens et al., "Minimization of the Fuel Consumption of a Gasoline Engine Using Dynamic Optimization", Applied Engery, vol. 86 Iss. 9, Sep. 2009, pp. 1582-1588.

* cited by examiner

VEHICLE ROLLBACK CONTROL SYSTEMS AND METHODS

CROSS-REFERENCE TO RELATED APPLICATIONS

This application claims the benefit of U.S. Provisional Application No. 61/350,178, filed on Jun. 1, 2010. The disclosure of the above application is incorporated herein by reference in its entirety.

This application is related to U.S. patent application Ser. No. 12/835,830 filed on Jul. 14, 2010, Ser. No. 12/835,835 filed on Jul. 14, 2010, Ser. No. 12/835,842 filed on Jul. 14, 2010, Ser. No. 12/835,848 filed on Jul. 14, 2010, Ser. No. 12/835,942 filed on Jul. 14, 2010, and Ser. No. 12/835,951 filed on Jul. 14, 2010. The disclosures of the above applications are incorporated herein by reference in their entirety.

FIELD

The present invention relates to internal combustion engines and more particularly to engine speed control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, injection of the fuel or spark provided by a spark plug.

An engine control module (ECM) controls the torque output of the engine. Under some circumstances, the ECM may shut down the engine between vehicle startup (e.g., key ON) and vehicle shutdown (e.g., key OFF). The ECM may selectively shut down the engine, for example, to increase fuel efficiency (i.e., reduce fuel consumption). The ECM may start the engine at a later time.

SUMMARY

A control system for an auto-stop/start vehicle includes a transmission load module, a target engine speed module, and an actuator control module. The transmission load module determines a load imposed on an engine through a transmission. The target engine speed module selectively determines a target engine speed during an engine startup event based on the load. The actuator control module controls at least one engine actuator based on the target engine speed during the engine startup event.

A control method for an auto-stop/start vehicle, includes: determining a load imposed on an engine through a transmission; selectively determining a target engine speed during an engine startup event based on the load; and controlling at least one engine actuator based on the target engine speed during the engine startup event.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
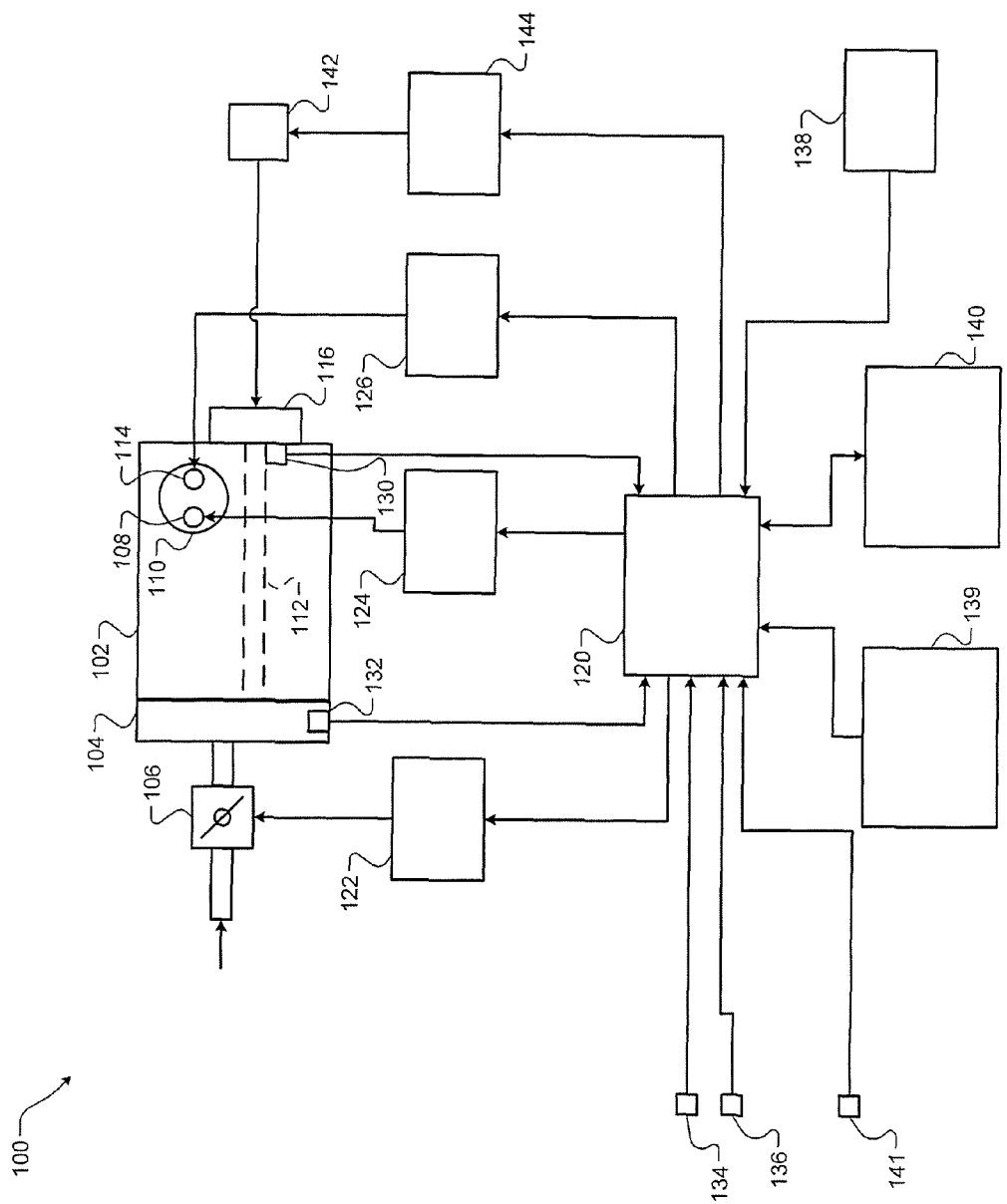
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine control module (ECM) may selectively start and shut down an engine of a vehicle. For example only, the ECM may start and shut down the engine when commanded to do so by a user, such as via a key or a button. A key cycle may refer to a period between a first time when the user commands vehicle startup and a second time when the user commands vehicle shutdown.

The ECM may selectively shut down and start the engine during a key cycle under some circumstances. An auto-stop event refers to an engine shutdown performed during a key cycle. The ECM may selectively initiate an auto-stop event, for example, to decrease fuel consumption. An auto-start event refers to an engine startup performed after an auto-stop event during a key cycle.

While the engine is shut down, pressure within an intake manifold of the engine approaches and may reach barometric pressure. When the pressure is at or near barometric pressure when the engine is started, an air per cylinder (APC) may be at or near an APC achieved when a throttle valve is in a wide open throttle (WOT) position.

During engine startup, the ECM may selectively set a spark timing to a maximum braking torque (MBT) spark timing. The combination of the pressure being at or near barometric pressure and the spark timing being set to the MBT spark timing causes the engine speed to overshoot a predetermined engine speed. Overshooting the predetermined engine speed during engine startup may be referred to as engine flare. A user may accept engine flare as being incidental to engine startup. However, as torque may be transmitted between the engine and the transmission during auto-start events, engine flare during an auto-start event may cause the vehicle to accelerate or decelerate. The ECM minimizes engine flare during engine startup.

The vehicle may roll backward during an auto-start event under some circumstances. For example only, the vehicle may roll backward during an auto-start event when the vehicle is stopped on a positive grade (e.g., facing up a hill). As torque may be transmitted through the transmission to the engine during auto-start events, a load (i.e., negative torque) attributable to the force in the backward direction may be imposed on the engine during an auto-start event. Failure to account for such a load while attempting to minimize or prevent engine flare may cause a stall, vibration, and/or one or more other conditions during an auto-start event.

The ECM of the present disclosure selectively disables an auto-stop event based on the transmission load. For example only, the ECM disables an auto-stop event and keeps the engine running when the transmission load is greater than a first predetermined load. When the transmission load is less than the first predetermined load but greater than a second predetermined load, the ECM allows an auto-stop event to be performed and the engine to be shut down. The ECM, however, may selectively apply one or more brakes of the vehicle during a auto-start event when the transmission load is greater than the second predetermined load. The application of the brakes may minimize rollback. The application of the brakes may even prevent rollback.

Referring now to FIG. 1, a functional block diagram of an exemplary engine system 100 is presented. An engine 102 generates drive torque for a vehicle. While the engine 102 is shown and will be discussed as a spark-combustion internal combustion engine (ICE), the engine 102 may include another suitable type of engine, such as a compression-combustion ICE. One or more electric motors (or motor-generators) may additionally generate drive torque.

Air is drawn into the engine 102 through an intake manifold 104. Airflow into the engine 102 may be varied using a throttle valve 106. One or more fuel injectors, such as fuel injector 108, mix fuel with the air to form an air/fuel mixture. The air/fuel mixture is combusted within cylinders of the engine 102, such as cylinder 110. Although the engine 102 is depicted as including one cylinder, the engine 102 may include more than one cylinder.

The cylinder 110 includes a piston (not shown) that is mechanically linked to a crankshaft 112. One combustion cycle within the cylinder 110 may include four phases: an intake phase, a compression phase, a combustion (or expansion) phase, and an exhaust phase. During the intake phase, the piston moves toward a bottommost position and draws air into the cylinder 110. During the compression phase, the piston moves toward a topmost position and compresses the air or air/fuel mixture within the cylinder 110.

During the combustion phase, spark from a spark plug 114 ignites the air/fuel mixture. The combustion of the air/fuel mixture drives the piston back toward the bottommost position, and the piston drives rotation of the crankshaft 112. Resulting exhaust gas is expelled from the cylinder 110 to complete the exhaust phase and the combustion event. A flywheel 116 is attached to and rotates with the crankshaft 112. The engine 102 outputs torque to a transmission (not shown) via the crankshaft 112.

An engine control module (ECM) 120 controls the torque output of the engine 102. The ECM 120 controls the throttle valve 106, the fuel injector 108, and the spark plug 114 via a throttle actuator module 122, a fuel actuator module 124, and a spark actuator module 126, respectively. More specifically, the ECM 120 controls opening of the throttle valve 106, fuel injection amount and timing, and spark timing. While not shown, the ECM 120 may also control other engine actuators, such as one or more camshaft phasers, an exhaust gas recirculation (EGR) valve, a boost device (e.g., a turbocharger or a supercharger), and/or other suitable engine actuators.

A crankshaft position sensor 130 monitors rotation of the crankshaft 112 and outputs a crankshaft position signal based on rotation of the crankshaft 112. The crankshaft position sensor 130 may also measure direction of rotation of the crankshaft 112. The crankshaft position sensor 130 may output a direction signal indicating the direction of rotation, or the crankshaft position sensor 130 may indicate the direction of rotation via the crankshaft position signal. The crankshaft position may be used, for example, to determine rotational speed of the crankshaft 112 (e.g., in revolutions per minute or RPM). The rotational speed of the crankshaft 112 may be referred to as engine speed. A manifold absolute pressure (MAP) sensor 132 measures pressure within the intake manifold 104 and generates a MAP signal based on the pressure.

The ECM 120 may control the torque output of the engine 102 based on one or more driver inputs, such as an accelerator pedal position (APP), a brake pedal position (BPP), and/or other suitable driver inputs. An APP sensor 134 measures position of an accelerator pedal (not shown) and generates an APP signal based on the position of the accelerator pedal. A BPP sensor 136 measures position of a brake pedal (not shown) and generates a BPP signal based on the position of the brake pedal.

The engine system 100 may include one or more other sensors 138, such as a mass air flowrate (MAF) sensor, an intake air temperature (IAT) sensor, an engine coolant temperature sensor, an engine oil temperature sensor, and/or other suitable sensors. The ECM 120 may control the torque output of the engine 102 based on one or more measured parameters. The ECM 120 may communicate with one or more other modules, such as a transmission control module (TCM) 139 and/or a chassis control module (CCM) 140. The CCM 140 may control application of mechanical brakes (not shown) of the vehicle. For example only, a user may control application of the mechanical brakes via the brake pedal, and the CCM 140 may control the mechanical brakes as an anti-lock braking system (ABS).

A user may input vehicle startup and vehicle shutdown commands via an ignition system 141 (collectively illustrated as ignition). For example only, the user may input vehicle startup and vehicle shutdown commands by turning a key, pressing a button, or in another suitable manner. A period between a time when a vehicle startup command is received and a later time when a vehicle shutdown command is received may be referred to as a key cycle.

When a vehicle startup command is received, the ECM 120 may start the engine 102. More specifically, the ECM 120 may activate and engage a starter 142 via a starter actuator module 144 when a vehicle startup command is received. The starter 142 drives rotation of the crankshaft 112. The starter 142 may engage, for example, the flywheel 116. The ECM 120 selectively begins supplying fuel to the engine 102 and initiating combustion as the starter 142 rotates the crankshaft 112. The ECM 120 disables fuel and spark to the engine 102 when a vehicle shutdown command is received.

The ECM 120 may selectively shut down the engine 102 during a key cycle (i.e., before a vehicle shutdown command is received) under some circumstances. An auto-stop event refers to shutting down the engine 102 during a key cycle. For example only, the ECM 120 may selectively perform an auto-stop event during a key cycle when a user applies pressure to the brake pedal and/or when one or more other suitable conditions are satisfied. Shutting down the engine 102 under such conditions may decrease fuel consumption.

The ECM 120 may later selectively terminate the auto-stop event and restart the engine 102. An auto-start event refers to starting the engine 102 after an auto-stop event during a key cycle. For example only, the ECM 120 may perform an auto-start event when the user releases the pressure from the brake pedal, when the user applies pressure to the accelerator pedal, and/or when one or more other suitable conditions are satisfied.

The MAP may approach barometric pressure when the engine 102 is shut down. When engine startup is initiated (e.g., for an auto-start event or for a vehicle startup command), the MAP may therefore be approximately equal to a MAP that may be present when the throttle valve 106 is in a wide open throttle (WOT) position.

During engine startup, the ECM 120 may set the spark timing to approximately a spark timing at which a maximum braking torque (MBT) will be produced under the operating conditions. This spark timing may be referred to as an MBT spark timing. Setting the spark timing to the MBT spark timing during engine startup may ensure that a significant amount of torque is produced and that the engine 102 does not stall.

Figure 2:
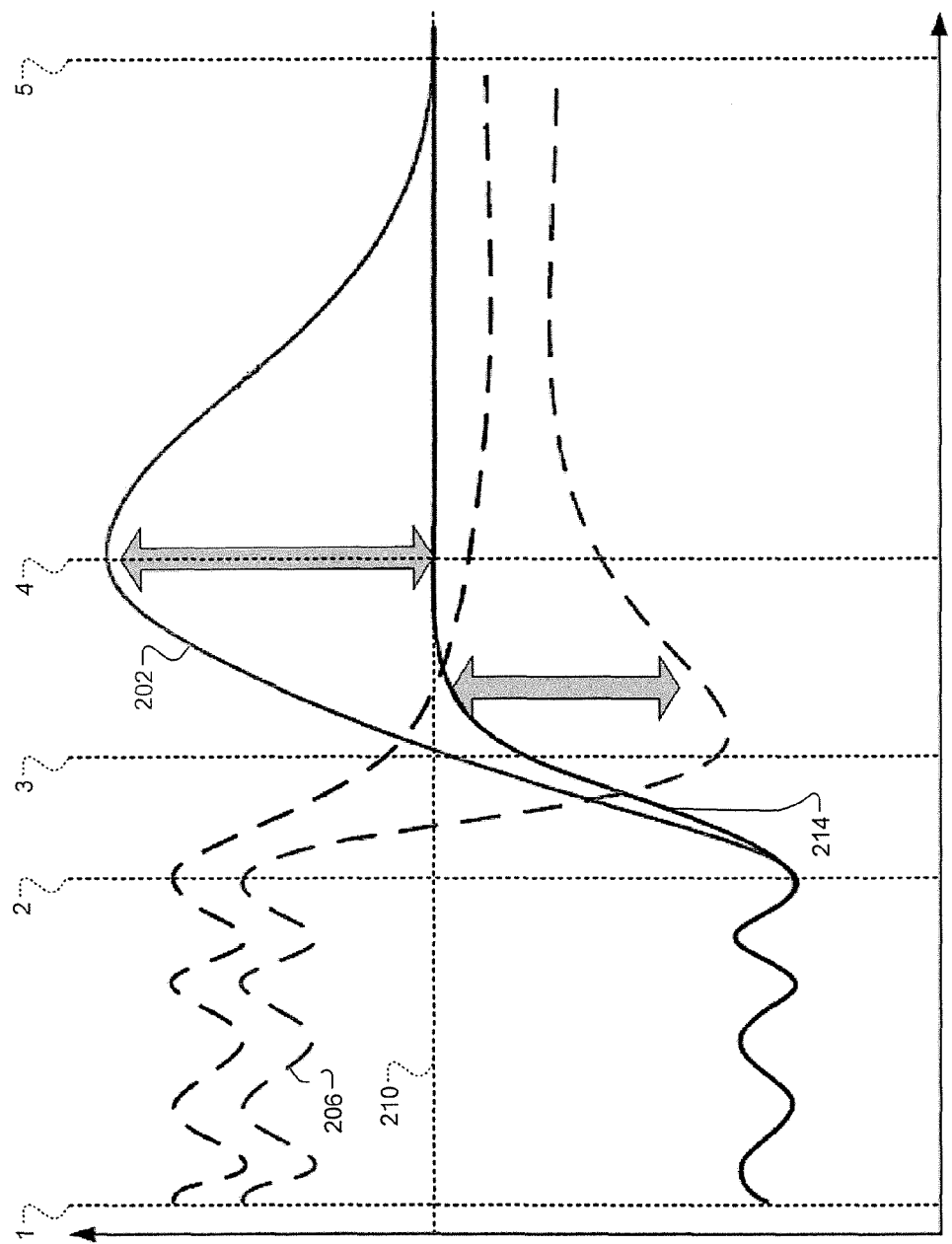
FIG. 2 includes exemplary graphs of engine speed and manifold absolute pressure (MAP) as functions of time according to the principles of the present disclosure.

Referring now to FIG. 2, exemplary graphs of engine speed and MAP as functions of time are presented. Exemplary trace 202 tracks the engine speed. Exemplary trace 206 tracks the MAP. An engine startup event is initiated at approximately time T1. The starter 142 drives rotation of the crankshaft 112. A first combustion event within the engine 102 occurs at approximately time T2, and the engine speed 202 increases toward a predetermined speed as torque is produced.

Exemplary line 210 illustrates the predetermined engine speed. For example only, the predetermined engine speed 210 may be a predetermined idle speed, such as approximately 700 RPM-900 RPM. The MAP being at or near barometric pressure in combination with the spark timing at approximately the MBT spark timing during engine startup may cause the engine speed 202 to overshoot the predetermined engine speed 210. The engine speed 202 exceeds the predetermined engine speed 210 at approximately time T3, and the engine speed 202 increases until approximately time T4.

The engine speed 202 begins decreasing at approximately time T4 and may decrease to approximately the predetermined engine speed 210 under some circumstances. The engine speed 202 may reach the predetermined engine speed 210 at approximately time T5. Thus, the engine speed 202 overshoots the predetermined engine speed 210 from approximately time T3 to approximately time T5. Overshooting the predetermined engine speed 210 during an engine startup may be referred to as engine flare.

In some vehicles, the transmission (and a torque transmission device, such as a torque converter) may be engaged to transmit torque between the engine 102 and a driveline (not shown) when the engine 102 is started pursuant to an auto-start event. Engine flare under such circumstances may cause vehicle acceleration or deceleration, and the acceleration or deceleration may be experienced within a passenger cabin of the vehicle. Engine flare may also cause the MAP 206 to decrease as the engine speed 202 overshoots the predetermined engine speed 210. The ECM 120 of the present disclosure minimizes engine flare. Exemplary trace 214 tracks the engine speed as controlled by the ECM 120 to minimize engine flare and overshoot.

The vehicle may roll in a backward (or reverse) direction during an auto-start event under some circumstances. For example only, the vehicle may roll backward during an auto-start event performed when the vehicle is stopped on a positive grade (e.g., facing up a hill). As torque may be transmitted through the transmission to the engine during auto-start events, a load (i.e., negative torque) attributable to rolling backwards may be imposed on the engine during an auto-start event. Load imposed on the engine via the transmission may be referred to as transmission load. Failure to account for the transmission load while attempting to minimize engine flare may cause a stall, vibration, and/or one or more other conditions during an auto-start event.

The ECM 120 of the present disclosure selectively disables performance of auto-stop and auto-start events based on the transmission load. For example only, the ECM 120 disables performance of auto-stop and auto-start events and maintains the engine 102 as running when the transmission load is greater than a first predetermined load. When the transmission load is less than the first predetermined load but greater than a second predetermined load, the ECM 120 allows an auto-start event to be performed. The ECM 120, however, commands application of the brakes while the engine 102 is started for auto-start events when the transmission load is greater than the second predetermined load. The application of the brakes may prevent or minimize rollback. When the transmission load is less than the second predetermined load but greater than zero, the ECM 120 may determine a target engine speed to prevent rollback.

The ECM 120 controls targets for opening of the throttle valve 106 (e.g., throttle position or throttle opening area), air fuel ratio (AFR), and the spark timing during an engine startup. The ECM 120 also determines the target engine speed based on a predetermined profile to be followed during the engine startup. The predetermined profile may be similar to the profile of the engine speed 214 of FIG. 2 or another suitable profile that may smoothly transition the engine speed up to the predetermined engine speed during an engine startup. The ECM 120 may select or adjust one or more characteristics of the predetermined profile based on the transmission load.

The ECM 120 determines a spark correction based on the target engine speed. More specifically, the ECM 120 determines the spark correction based on a difference between the target engine speed and the measured engine speed. The ECM 120 adjusts the target spark timing based on the spark correction and sets the spark timing to the adjusted spark timing. In this manner, the ECM 120 controls the engine speed to track the predetermined profile and minimizes overshoot during engine startup.

Figure 3:
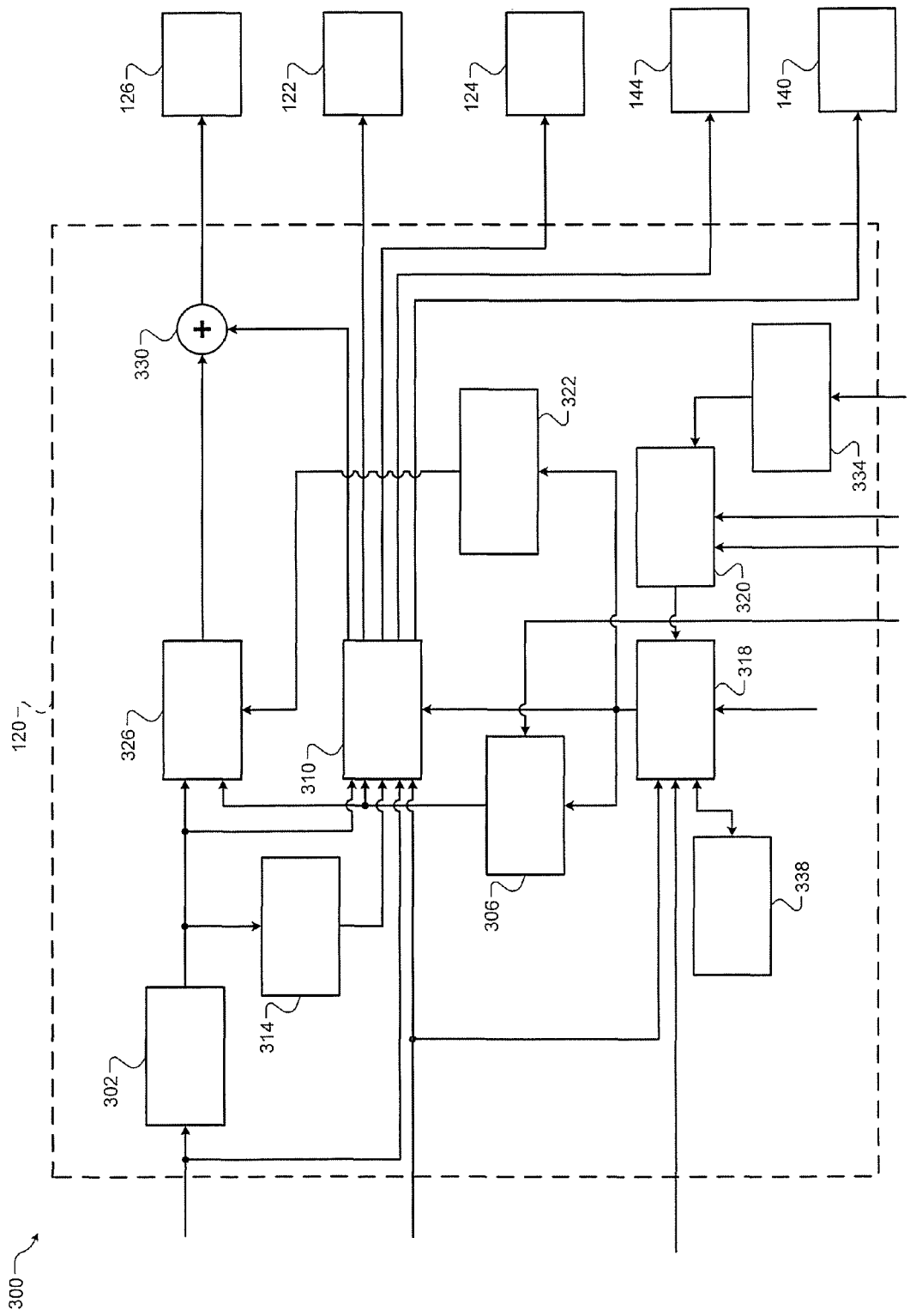
FIG. 3 is a functional block diagram of an exemplary engine control system according to the principles of the present disclosure.

Referring now to FIG. 3, a functional block diagram of an exemplary engine control system 300 is presented. The ECM 120 may include an engine speed determination module 302, a target engine speed module 306, an actuator control module 310, an engine load estimation module 314, a mode control module 318, and an auto-stop/start module 320. The ECM 120 may also include a correction disabling module 322, a correction determination module 326, a spark timing adjustment module 330, and an auto-stop/start disabling module 334.

The engine speed determination module 302 determines the engine speed. The engine speed determination module 302 may determine the engine speed based on the crankshaft position signal. For example only, the crankshaft position sensor 130 may generate a pulse in the crankshaft position signal when a tooth of an N-toothed wheel (e.g., the flywheel 116) passes the crankshaft position sensor 130. The engine speed determination module 302 may determine the engine speed based on a period between two or more of the pulses.

The target engine speed module 306 determines the target engine speed based on a control mode and the transmission load. In various implementations, the ECM 120 may determine the transmission load or the transmission load may be provided by the TCM 139 or another suitable source. The transmission load may be determined based on vehicle weight, grade of the driving surface, and/or other suitable parameters.

The target engine speed module 306 may determine the target engine speed based on a predetermined profile for smoothly transitioning the engine speed up to the predetermined engine speed during an engine startup. The target engine speed module 306 may select the predetermined profile from a plurality of predetermined profiles or adjust one or more characteristics of the predetermined profile based on the transmission load. For example only, the selected predetermined profile may include a greater slope in increasing up to the predetermined engine speed or the target engine speed module 306 may adjust the predetermined profile to have a greater slope when the transmission load is greater than zero. The greater slope may be relative to a slope of the predetermined profile when the transmission load is zero (e.g., when the vehicle is on a level road surface) or when the transmission load is negative (e.g., when the vehicle is facing down a hill). The greater slope when the transmission load is zero may minimize vehicle rollback. The greater slope may even prevent vehicle rollback.

The target engine speed module 306 may determine the target engine speed further based on a driver torque request, the engine coolant temperature, the oil temperature, and/or one or more other suitable parameters. The driver torque request may be determined based on the APP, the BPP, cruise control inputs, and/or one or more other driver inputs.

The actuator control module 310 determines a target spark timing, a target throttle opening, and a target fueling. The actuator control module 310 may determine the target spark timing, the target throttle opening, and/or the target fueling based on the target engine speed, the engine speed, and the control mode. The actuator control module 310 may determine the target spark timing, the target throttle opening, and/or the target fueling further based on an engine load, the MAP, and/or one or more other parameters. For example only, a mass of air per cylinder (APC) for a given combustion event may be determined based on the MAP. The actuator control module 310 may set the target fueling for the combustion event based on the APC and a stoichiometric air/fuel mixture. The engine load estimation module 314 may estimate the engine load based on the engine speed and/or one or more suitable parameters.

Figure 4:
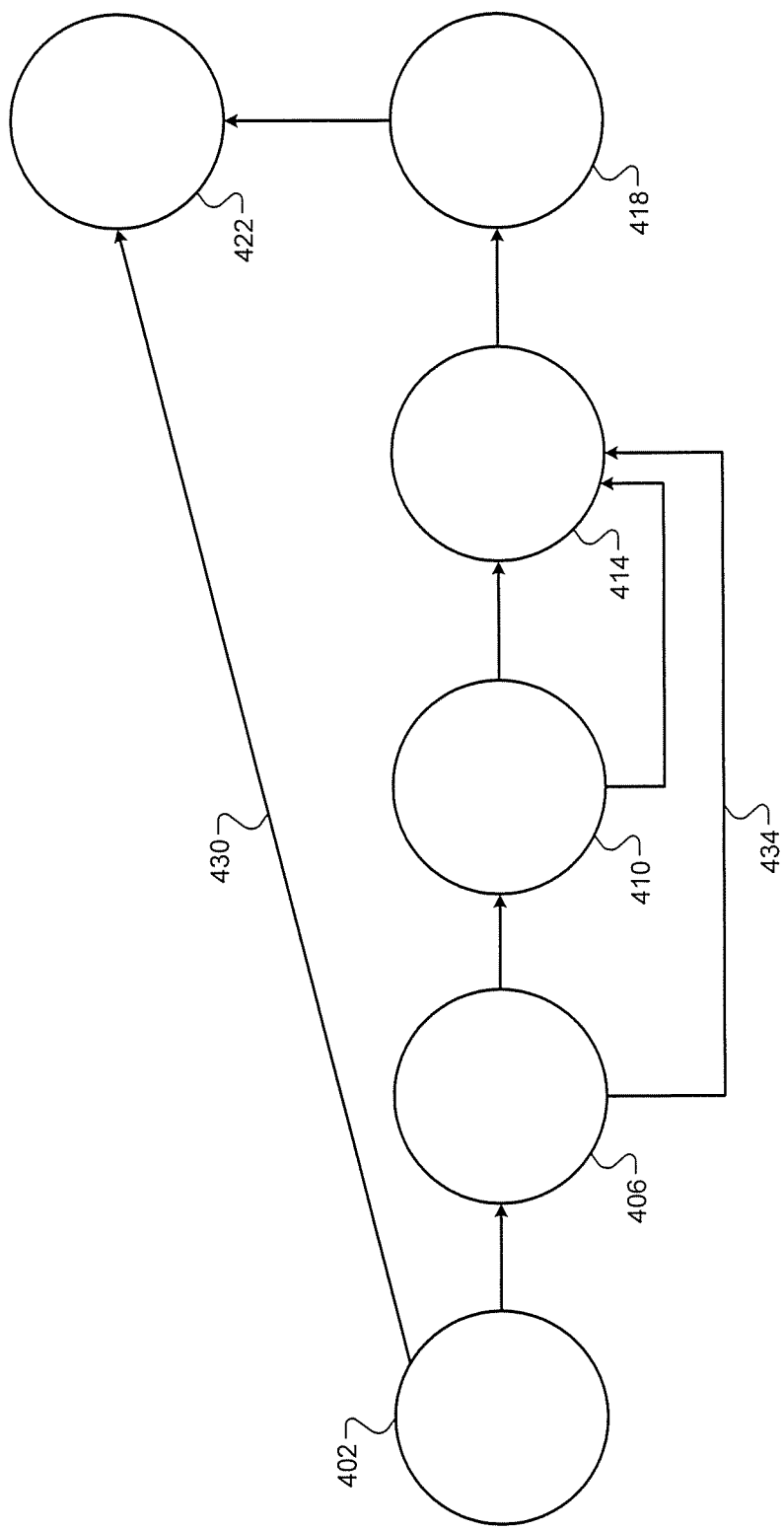
FIG. 4 is an exemplary mode-flow diagram according to the principles of the present disclosure.

The mode control module 318 may provide the control mode to the actuator control module 310. FIG. 4 includes an exemplary mode-flow diagram. For example only, as shown in the example of FIG. 4, the control modes may include a throttle holding mode 402, a manifold refill mode 406, a MAP holding mode 410, a choking mode 414, a cranking airflow mode 418, and a speed control mode 422. The mode control module 318 may set the control mode based on the engine speed, the MAP, auto-stop/start commands, and one or more other suitable parameters.

The auto-stop/start module 320 may selectively generate an auto-stop command during a key cycle. For example only, the auto-stop/start module 320 may generate an auto-stop command when the APP is approximately equal to a predetermined zero APP and the BPP is greater than a predetermined zero BPP while the vehicle speed is less than a predetermined speed. The predetermined zero APP may correspond to the APP when no pressure is being applied to the accelerator pedal. The predetermined zero BPP may correspond to the BPP when no pressure is being applied to the brake pedal.

The mode control module 318 initiates an auto-stop event when an auto-stop command is generated. The mode control module 318 may initiate an auto-stop event by setting the control mode to the throttle holding mode 402. The actuator control module 310 disables the provision of fuel and spark to the engine 102 when the control mode is set to the throttle holding mode 402. The actuator control module 310 may set the target throttle opening to a first predetermined throttle opening when the control mode is set to the throttle holding mode 402. For example only, the first predetermined throttle opening may include a predetermined idle throttle opening or another suitable throttle opening. Disabling the provision of fuel and spark to the engine 102 allows the engine speed to decrease toward zero as no torque is being produced by the engine 102.

The mode control module 318 may maintain the control mode in the throttle holding mode 402 until the engine speed reaches zero. The engine 102 may be deemed shut down when the engine speed is equal to zero. The engine speed may be deemed equal to zero when the engine speed is less than a predetermined zero speed. For example only, the predetermined zero speed may be approximately 30-50 RPM.

During the throttle holding mode 402 (i.e., before the engine speed reaches zero), the mode control module 318 may selectively transition the control mode to the speed control mode 422. Such a transition from the throttle holding mode 402 to the speed control mode 422 is illustrated in the example of FIG. 4 by line 430. For example only, the mode control module 318 may transition the control mode to the speed control mode 422 when the auto-stop/start module 320 generates an auto-start command.

The auto-stop/start module 320 may generate an auto-start command, for example, when the BPP approaches or reaches the predetermined zero BPP and/or when the APP is greater than the predetermined zero APP during the throttle holding mode 402. The target engine speed module 306 may set the target engine speed to the predetermined engine speed or to another speed when the control mode is set to the speed control mode 422.

The mode control module 318 may selectively transition the control mode to the manifold refill mode 406 when the engine speed reaches zero during the throttle holding mode 402. When the control mode is set to the manifold refill mode 406, the actuator control module 310 may set the target throttle opening to a second predetermined throttle opening. For example only, the second predetermined throttle opening may include the WOT opening or another suitable throttle opening that allows the MAP to increase toward barometric pressure. The second predetermined throttle opening is greater than the first predetermined throttle opening.

The mode control module 318 starts a timer in a timer module 338 when the mode control module 318 transitions the control mode from the throttle holding mode 402 to the manifold refill mode 406. The timer tracks the period elapsed since the control mode was set to the manifold refill mode 406. During the manifold refill mode 406, the mode control module 318 may selectively transition the control mode to the choking mode 414 when the timer is less than a predetermined period. For example only, the mode control module 318 may transition the control mode to the choking mode 414 when the auto-stop/start module generates an auto-start command and the timer is less than the predetermined period. In this manner, if the engine 102 should be auto-started when the control mode has been set to the manifold refill mode 406 for less than the predetermined period, the MAP holding mode 410 may be skipped in favor of the choking mode 414. Such a transition from the manifold refill mode 406 to the choking mode 414 is illustrated in the example of FIG. 4 by line 434. The choking mode 414 is discussed further below. For example only, the period may be approximately 6 seconds.

If the MAP exceeds a first predetermined pressure during the manifold refill mode 406, the mode control module 318 may transition the control mode to the MAP holding mode 410. For example only, the first predetermined pressure may be a predetermined amount or percentage less than barometric pressure.

When the control mode is set to the MAP holding mode 410, the actuator control module 310 may set the target throttle opening to a fully closed throttle opening. Setting the target throttle opening to the fully closed throttle opening may be performed to maintain the MAP at approximately the first predetermined pressure and below barometric pressure in anticipation of auto-starting the engine 102.

Despite the throttle valve 106 being fully closed, however, the MAP may increase toward barometric pressure. For example only, a MAP increase may be attributable to inflow through open intake and exhaust valves and/or through the throttle valve 106. Accordingly, the MAP may increase toward barometric pressure during the MAP holding mode 410.

When an auto-start command is generated by the auto-stop/start module 320, the mode control module 318 initiates an auto-start event. The mode control module 318 may start the engine 102 (e.g., for an auto-start event or a vehicle startup command) by setting the control mode to the choking mode 414. The actuator control module 310 sets the target throttle opening to the fully closed throttle opening when the control mode is set to the choking mode 414. The actuator control module 310 may also crank the engine 102 via the starter 142 when the control mode is set to the choking mode 414.

Cranking the engine 102 while the throttle valve 106 is fully closed causes the MAP to decrease. The actuator control module 310 begins supplying fuel to the engine 102 during the choking mode 414. The actuator control module 310 sets the target spark timing for each combustion event that occurs after the control mode is transitioned to the choking mode 414.

The actuator control module 310 selectively controls application of the brakes based on the transmission load when an auto-start command is generated. The actuator control module 310 may control application of the brakes via the CCM 140. More specifically, the actuator control module 310 may transmit a signal to the CCM 140, and the CCM 140 may control the application of the brakes based on the signal. For example only, the actuator control module 310 may apply the brakes when the transmission load is greater than the second predetermined load. The second predetermined load is greater than zero and less than the first predetermined load.

The actuator control module 310 may control the extent to which the brakes are applied based on the transmission load. For example only, the actuator control module 310 may apply the brakes to a greater extent or for a longer period as the transmission load increases toward the first predetermined load. The actuator control module 310 may gradually release the brakes as the engine speed increases toward the predetermined speed or in another suitable manner.

The mode control module 318 may transition the control mode to the cranking airflow mode 418 when the MAP falls below a second predetermined pressure during the choking mode 414. The second predetermined pressure may be less than the first predetermined pressure. The actuator control module 310 may continue cranking the engine 102 during the cranking airflow mode 418.

The actuator control module 310 may set the target throttle opening based on the target engine speed during the cranking airflow mode 418. In other words, the actuator control module 310 selectively opens the throttle valve 106 during the cranking airflow mode 418 and allows airflow into the intake manifold 104 during the cranking airflow mode 418. The mode control module 318 may set the control mode to the speed control mode 422 after the cranking airflow mode 418.

The correction disabling module 322 selectively enables and disables the correction determination module 326 based on the control mode. More specifically, the correction disabling module 322 enables the correction determination module 326 when the control mode is set to the choking mode 414 or to the cranking airflow mode 418. Written conversely, the correction disabling module 322 may disable the correction determination module 326 when the control mode is set to the throttle holding mode 402, the manifold refill mode 406, or the MAP holding mode 410. In this manner, the correction disabling module 322 enables the correction determination module 326 when the engine 102 is started pursuant to a vehicle startup command or to an auto-start event.

The actuator control module 310 may determine the target spark timing based upon an inverse of a relationship between torque and the target spark timing. For example only, the actuator control module 310 may determine a target amount of torque and determine the target spark timing based on the relationship:

$$S_T = T^{-1}(T_T, APC, I, E, AF, OT, \#),$$

where $S_T$ is the target spark timing, $T^{-1}$ is an inverse torque model, $T_T$ is the target torque, APC is the air per cylinder (APC), I and E are intake and exhaust phaser positions, respectively, AF corresponds to the air/fuel mixture, OT is the oil temperature, and # is the number of cylinders that will be capable of producing torque (i.e., supplied fuel) when the target spark timing is executed for the one of the cylinders. This relationship may be embodied as an equation and/or as a lookup table. The actuator control module 310 may determine the target torque based on, for example, the engine speed, the target engine speed, the driver torque request, one or more engine operating parameters, and/or other suitable parameters.

When enabled, the correction determination module 326 determines a spark timing correction based on the engine speed and the target engine speed. More specifically, the correction determination module 326 determines the spark timing correction based on a difference between the target engine speed and the engine speed.

The correction determination module 326 may determine the spark timing correction using a proportional control scheme based on the difference between the target engine speed and the engine speed. For example only, the correction determination module 326 may determine the spark timing correction using the equation:

$$\text{Correction} = k^*(\text{Target} - \text{Actual}),$$

where Correction is the spark timing correction, k is a proportional gain, Target is the target engine speed, and Actual is the engine speed.

The spark timing adjustment module 330 receives the target spark timing and the spark timing correction. The spark timing adjustment module 330 adjusts the target spark timing based on the spark timing correction and outputs an adjusted spark timing. For example only, the spark timing adjustment module 330 may determine the adjusted spark timing based on a sum of the spark timing correction and the target spark timing.

The spark timing adjustment module 330 may provide the adjusted spark timing to the spark actuator module 126. The spark actuator module 126 provides spark at the adjusted spark timing. In this manner, the spark timing is adjusted to shape the engine speed toward the target engine speed and to minimize overshoot and engine flare during engine startup.

While the principles of the present disclosure are discussed as relating to adjusting the spark timing, the principles of the present disclosure are also applicable to adjusting fuel injection timing in compression-combustion engines. For example only, the fuel injection timing may be adjusted based on an injection timing correction that is determined based on the difference between the target engine speed and the engine speed in compression-combustion engine systems.

The auto-stop/start disabling module 334 selectively enables or disables the auto-stop/start module 320 based on the transmission load. For example only, the auto-stop/start disabling module 334 may disable the auto-stop/start module 320 when the transmission load is greater than the first predetermined load. In this manner, the auto-stop/start disabling module 334 prevents the performance of auto-stop (and associated auto-start) events when the transmission load is greater than the first predetermined load. The first predetermined load is greater than the second predetermined load and may correspond to a predetermined maximum allowable rollback distance.

Figure 5:
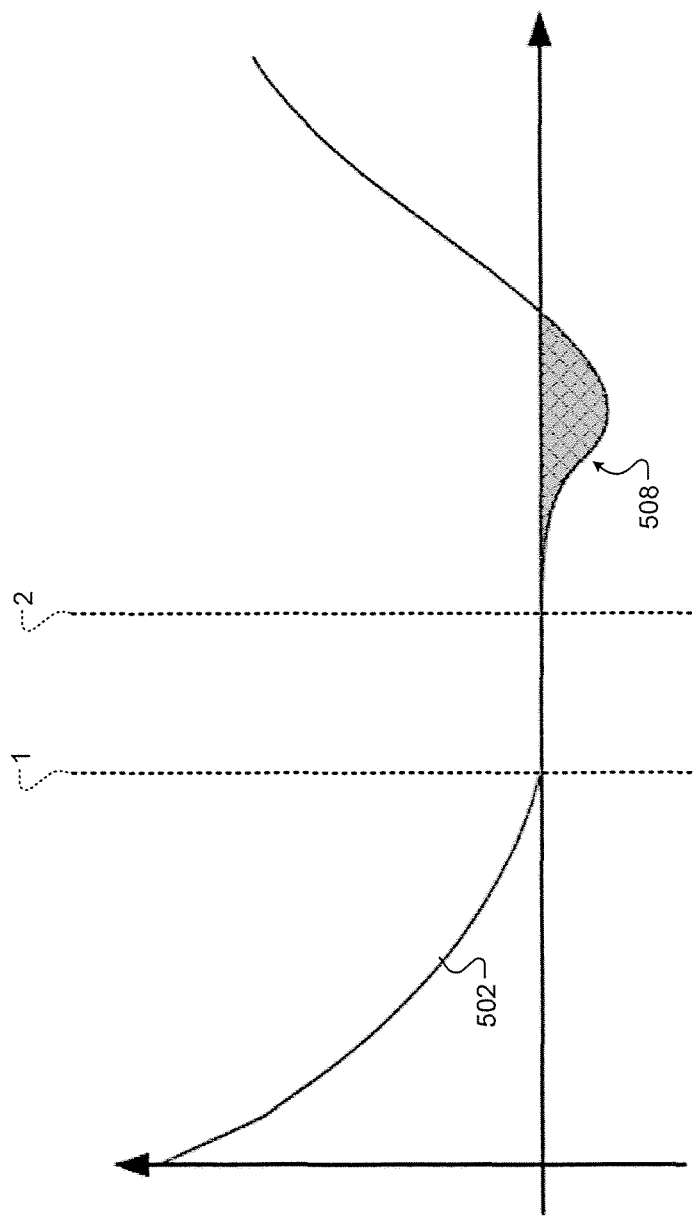
FIG. 5 is an exemplary graph of vehicle speed versus time according to the principles of the present disclosure.

Referring now to FIG. 5, an exemplary graph of vehicle speed versus time is presented. Exemplary trace 502 tracks vehicle speed. The vehicle speed 502 decreases toward zero and the vehicle comes to a stop at approximately time T1. The auto-stop/start module 320 may generate an auto-stop command to shut down the engine 102 while the vehicle speed 502 decreases or when the vehicle is stopped.

The auto-stop/start module 320 may generate an auto-start command at approximately time T2. For example only, the auto-stop/start module 320 may generate the auto-stop command when the user removes pressure from the brake pedal. As the brakes are released, the vehicle may roll backward when the transmission load is greater than zero. Exemplary vehicle rollback is illustrated in the example of FIG. 5 at 508 by the vehicle speed becoming negative. The ECM 120 of the present disclosure accounts for the transmission load and prevents or minimizes vehicle rollback.

Figure 6:
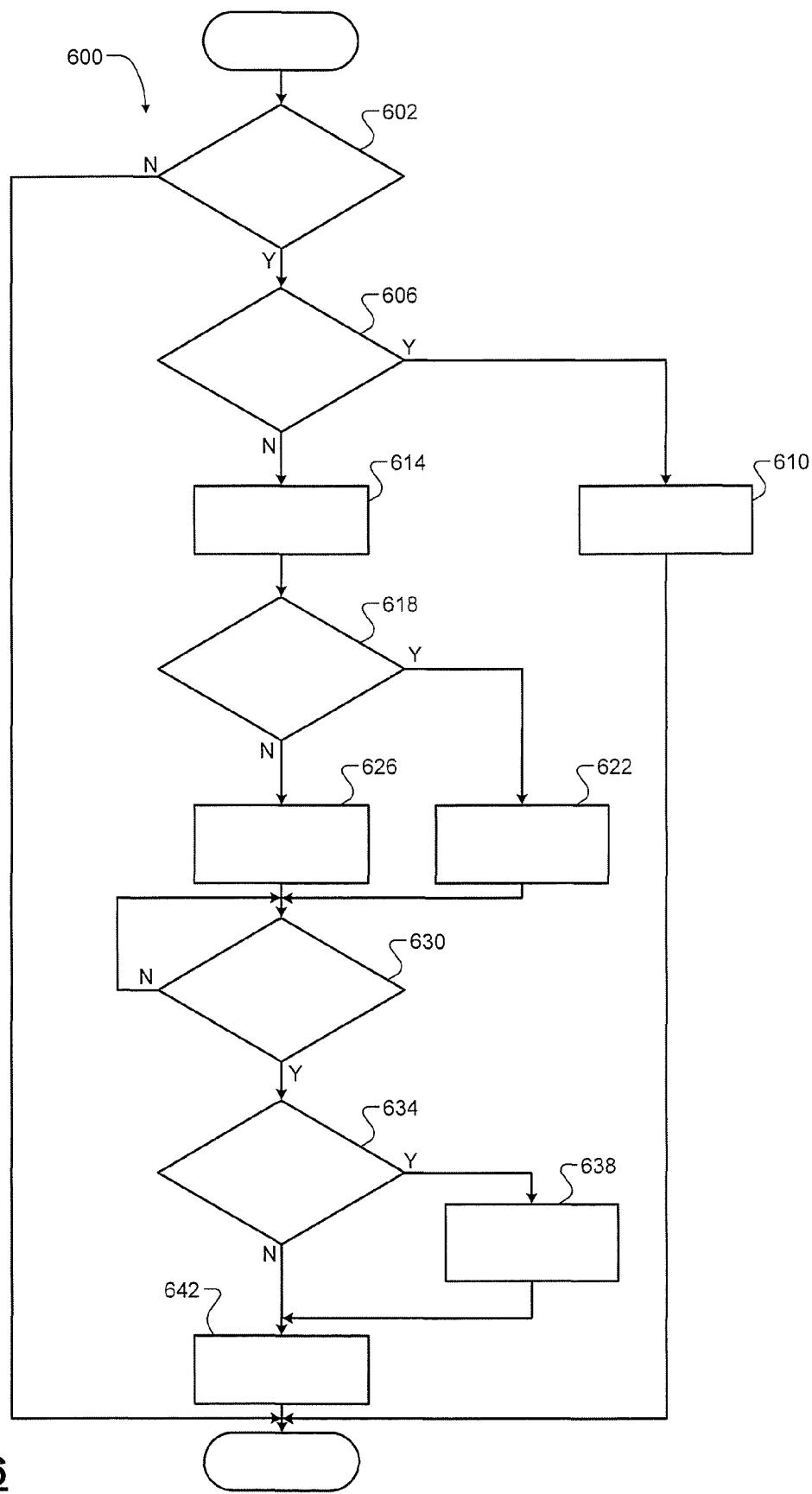
FIG. 6 is a flowchart depicting an exemplary method of minimizing vehicle rollback experienced during an auto-start event according to the principles of the present disclosure.

Referring now to FIG. 6, a flowchart depicting an exemplary method 600 of minimizing vehicle rollback experienced during an auto-start event is presented. Control may begin with 602 where control determines whether an auto-stop/start event (i.e., an auto-stop event that may be followed by an auto-start event) should be initiated. More specifically, control determines whether an auto-stop event may be performed at 602. If true, control may continue with 606; if false, control may end.

At 606, control may determine whether the transmission load is greater than the first predetermined load. If true, control may disable the auto-stop event at 610 and end; if false, control may continue with 614. In this manner, control may refrain from performing the auto-stop event and shutting down the engine 102 when the transmission load is greater than the first predetermined load. Control performs the auto-stop event and shuts down the engine at 614 (i.e., when the transmission load is less than or equal to the first predetermined load).

Control determines whether the transmission load is greater than the second predetermined load at 618. If true, control may determine the target engine speed at 622 based on a first predetermined profile or increase a slope of a predetermined profile. If false, control may determine the target engine speed at 626 based on a second predetermined profile or based on the predetermined profile having a lesser slope. Control may continue with 630.

At 630, control determines whether to perform an auto-start event and start the engine 102. If true, control may continue with 634; if false, control may remain at 630. At 634, control may determine whether the transmission load is greater than the second predetermined load. If true, control may apply the brakes of the vehicle at 638 and proceed with 642; if false, control may continue with 642. Control may also determine the extent to which the brakes should be applied at 638 based on the transmission load. Control may perform the auto-start event and start the engine 102 at 642. Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an auto-stop/start vehicle, comprising:
 a transmission load module that determines a load imposed on an engine through a transmission based on a vehicle weight and a grade of a road;
 a target engine speed module that selectively determines a target engine speed during an engine startup event based on the load; and
 an actuator control module that controls at least one engine actuator based on the target engine speed during the engine startup event.

2. The control system of claim 1 further comprising:
 an auto-stop/start module that selectively shuts down the engine between a first time when a vehicle startup command is received and a second time when a vehicle shutdown command is received and that selectively initiates the engine startup event between the first and second times; and
 an auto-stop/start disabling module that disables the auto-stop/start module when the load is greater than a predetermined load.

3. The control system of claim 2 wherein the actuator control module selectively applies mechanical brakes during the engine startup event when the load is greater than a second predetermined load, and
 wherein the second predetermined load is less than the predetermined load.

4. The control system of claim 3 wherein the actuator control module controls the application of the mechanical brakes based on the load.

5. The control system of claim 3 wherein the target engine speed module determines the target engine speed based on whether the load is greater than the second predetermined load.

6. The control system of claim 5 wherein the target engine speed module determines the target engine speed based on a first predetermined profile when the load is greater than the second predetermined load and determines the target engine speed based on a second predetermined profile when the load is greater than zero and one of less than and equal to the second predetermined profile, wherein the first and second predetermined profiles are different.

7. The control system of claim 6 wherein the first predetermined profile approaches a predetermined speed at a greater slope during the engine startup event than the second predetermined profile.

8. The control system of claim 1 further comprising:
a correction determination module that determines a spark timing correction based on a difference between the target engine speed and a measured engine speed; and
a spark timing adjustment module that determines an adjusted spark timing based on the spark timing correction and a target spark timing and that controls spark during the engine startup event based on the adjusted spark timing.

9. A control method for an auto-stop/start vehicle, comprising:
determining a load imposed on an engine through a transmission based on a vehicle weight and a grade of a road;
selectively determining a target engine speed during an engine startup event based on the load; and
controlling at least one engine actuator based on the target engine speed during the engine startup event.

10. The control method of claim 9 further comprising:
selectively shutting down the engine between a first time when a vehicle startup command is received and a second time when a vehicle shutdown command is received;
selectively initiating the engine startup event between the first and second times; and
preventing the selective shut down when the load is greater than a predetermined load.

11. The control method of claim 10 further comprising selectively applying mechanical brakes during the engine startup event when the load is greater than a second predetermined load, and
wherein the second predetermined load is less than the predetermined load.

12. The control method of claim 11 further comprising controlling the application of the mechanical brakes based on the load.

13. The control method of claim 11 further comprising determining the target engine speed based on whether the load is greater than the second predetermined load.

14. The control method of claim 13 further comprising:
determining the target engine speed based on a first predetermined profile when the load is greater than the second predetermined load; and
determining the target engine speed based on a second predetermined profile when the load is greater than zero and one of less than and equal to the second predetermined profile, wherein the first and second predetermined profiles are different.

15. The control method of claim 14 wherein the first predetermined profile approaches a predetermined speed at a greater slope during the engine startup event than the second predetermined profile.

16. The control method of claim 9 further comprising:
determining a spark timing correction based on a difference between the target engine speed and a measured engine speed;
determining an adjusted spark timing based on the spark timing correction and a target spark timing; and
controlling spark during the engine startup event based on the adjusted spark timing.

17. A control system for an auto-stop/start vehicle, comprising:
a transmission load module that determines a load imposed on an engine through a transmission;
a target engine speed module that selectively determines a target engine speed during an engine startup event based on the load;
an actuator control module that controls at least one engine actuator based on the target engine speed during the engine startup event;
an auto-stop/start module that selectively shuts down the engine between a first time when a vehicle startup command is received and a second time when a vehicle shutdown command is received and that selectively initiates the engine startup event between the first and second times; and
an auto-stop/start disabling module that disables the auto-stop/start module when the load is greater than a predetermined load.

18. The control system of claim 17 wherein the actuator control module selectively applies mechanical brakes during the engine startup event when the load is greater than a second predetermined load, and
wherein the second predetermined load is less than the predetermined load.

19. The control system of claim 18 wherein the actuator control module controls the application of the mechanical brakes based on the load.

20. The control system of claim 18 wherein the target engine speed module determines the target engine speed based on whether the load is greater than the second predetermined load.

21. The control system of claim 20 wherein the target engine speed module determines the target engine speed based on a first predetermined profile when the load is greater than the second predetermined load and determines the target engine speed based on a second predetermined profile when the load is greater than zero and one of less than and equal to the second predetermined profile, wherein the first and second predetermined profiles are different.

22. A control method for an auto-stop/start vehicle, comprising:
determining a load imposed on an engine through a transmission;
selectively determining a target engine speed during an engine startup event based on the load;
controlling at least one engine actuator based on the target engine speed during the engine startup event;
selectively shutting down the engine between a first time when a vehicle startup command is received and a second time when a vehicle shutdown command is received;

selectively initiating the engine startup event between the first and second times; and preventing the selective shut down when the load is greater than a predetermined load.

23. The control method of claim 22 further comprising selectively applying mechanical brakes during the engine startup event when the load is greater than a second predetermined load, and wherein the second predetermined load is less than the predetermined load.

24. The control method of claim 23 further comprising controlling the application of the mechanical brakes based on the load.

25. The control method of claim 23 further comprising determining the target engine speed based on whether the load is greater than the second predetermined load.

26. The control method of claim 25 further comprising:

determining the target engine speed based on a first predetermined profile when the load is greater than the second predetermined load; and determining the target engine speed based on a second predetermined profile when the load is greater than zero and one of less than and equal to the second predetermined profile, wherein the first and second predetermined profiles are different.

* * * * *